US010081758B2

(12) United States Patent
Dreyer et al.

(10) Patent No.: US 10,081,758 B2
(45) Date of Patent: Sep. 25, 2018

(54) CONTROLLED RELEASE SOLID SCALE INHIBITORS

(71) Applicant: Ecolab USA Inc., St. Paul, MN (US)

(72) Inventors: Daniel R. Dreyer, Missouri City, TX (US); Pious Kurian, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 14/959,827

(22) Filed: Dec. 4, 2015

(65) Prior Publication Data

US 2017/0158945 A1 Jun. 8, 2017

(51) Int. Cl.
| | |
|---|---|
| C09K 8/62 | (2006.01) |
| C09K 8/528 | (2006.01) |
| C09K 8/536 | (2006.01) |
| C09K 8/80 | (2006.01) |
| E21B 37/06 | (2006.01) |
| E21B 43/26 | (2006.01) |
| E21B 43/267 | (2006.01) |

(52) U.S. Cl.
CPC .............. *C09K 8/528* (2013.01); *C09K 8/536* (2013.01); *C09K 8/62* (2013.01); *C09K 8/80* (2013.01); *E21B 37/06* (2013.01); *E21B 43/26* (2013.01); *E21B 43/267* (2013.01)

(58) Field of Classification Search
CPC .... C03C 3/16; C03C 3/17; C03C 3/19; C03C 3/21; C03C 8/08
IPC ....................... C03C 3/16,3/17, 3/19, 3/21, 8/08
See application file for complete search history.

(56) References Cited

U.S. PATENT DOCUMENTS

| | | | |
|---|---|---|---|
| 2,365,489 A | 12/1944 | Partridge | |
| 2,437,475 A | 3/1948 | Oxford, Jr. | |
| 2,601,395 A | 6/1952 | Hatch | |
| 3,284,368 A | 11/1966 | Hatch | |
| 3,338,670 A | 8/1967 | Fuchs | |
| 3,432,428 A * | 3/1969 | Robertson | C03C 3/16 |
| | | | 210/668 |
| 3,477,956 A | 11/1969 | Stanford et al. | |
| 3,480,083 A | 11/1969 | Oleen | |
| 3,532,167 A | 10/1970 | Noe, Jr. et al. | |
| 3,584,687 A | 6/1971 | Stanford et al. | |
| 3,597,352 A | 8/1971 | Stanford et al. | |
| 3,620,974 A | 11/1971 | Stanford et al. | |

(Continued)

FOREIGN PATENT DOCUMENTS

| | | |
|---|---|---|
| CA | 772 126 A | 11/1967 |
| EP | 0046078 A1 | 2/1982 |

(Continued)

OTHER PUBLICATIONS

Brauer, "Phosphate Glasses," Bio-Glasses: An Introduction, First Edition; 2012, John Wiley & Sons, Ltd., pp. 45-64.

(Continued)

*Primary Examiner* — Noah S Wiese
(74) *Attorney, Agent, or Firm* — Senniger Powers LLP

(57) ABSTRACT

Compositions and methods of preparation and use for controlled release scale inhibitors used in hydraulic fracturing operations in oil and gas wells. The controlled release scale inhibitors comprise modified polyphosphate glasses having predetermined dissolution rates for controlled release of chemical inhibitors in induced hydraulic fractures in hydraulic fracturing treatment of oil and/or gas wells.

20 Claims, 3 Drawing Sheets

(56) References Cited

U.S. PATENT DOCUMENTS

| | | | |
|---|---|---|---|
| 3,633,672 A | 1/1972 | Smith et al. | |
| 3,639,263 A | 2/1972 | Troscinski et al. | |
| 3,654,993 A | 4/1972 | Smith et al. | |
| 3,720,505 A * | 3/1973 | Vogel | C03C 3/16 65/117 |
| 3,787,534 A | 1/1974 | Stanford et al. | |
| 3,827,977 A | 8/1974 | Miles et al. | |
| 3,880,765 A | 4/1975 | Watson | |
| 3,931,038 A | 1/1976 | Mochi-Bartolani et al. | |
| 3,933,689 A | 1/1976 | Ray et al. | |
| 3,948,792 A | 4/1976 | Watsen et al. | |
| 4,008,164 A | 2/1977 | Watson et al. | |
| 4,046,540 A * | 9/1977 | Lewis | B29C 45/00 65/122 |
| 4,051,110 A | 9/1977 | Quinlan | |
| 4,080,375 A | 3/1978 | Quinlan | |
| 4,172,032 A | 10/1979 | Farley | |
| 4,187,245 A | 2/1980 | Redmore et al. | |
| 4,234,511 A | 11/1980 | Buckman | |
| 4,291,763 A | 9/1981 | Singer | |
| 4,309,485 A * | 1/1982 | Kondo | C03C 8/08 257/E23.006 |
| 4,326,873 A | 4/1982 | Reilly et al. | |
| 4,357,248 A | 11/1982 | Berkshire et al. | |
| 4,393,938 A | 7/1983 | Lawson et al. | |
| 4,406,811 A | 9/1983 | Christensen et al. | |
| 4,431,547 A | 2/1984 | Dubin | |
| 4,602,683 A | 7/1986 | Meyers | |
| 4,604,211 A | 8/1986 | Kneller et al. | |
| 4,642,194 A | 2/1987 | Johnson | |
| 4,676,911 A | 6/1987 | Fong | |
| 4,762,626 A | 8/1988 | Emmons et al. | |
| 4,801,388 A | 1/1989 | Fong et al. | |
| 4,809,778 A | 3/1989 | Johnson | |
| 4,817,722 A | 4/1989 | Montfort, Jr. et al. | |
| 4,860,829 A | 8/1989 | Carlberg et al. | |
| 5,018,577 A | 5/1991 | Pardue et al. | |
| 5,085,794 A | 2/1992 | Kneller et al. | |
| 5,112,496 A | 5/1992 | Dhawan et al. | |
| 5,141,655 A | 8/1992 | Hen | |
| 5,143,622 A | 9/1992 | Fong et al. | |
| 5,167,828 A | 12/1992 | Emmons et al. | |
| 5,171,459 A | 12/1992 | Kaplan | |
| 5,302,293 A | 4/1994 | Kaplan et al. | |
| 5,346,010 A | 9/1994 | Adams et al. | |
| 5,399,270 A | 3/1995 | Hen | |
| 5,403,493 A | 4/1995 | Mouche et al. | |
| 5,614,006 A * | 3/1997 | Algar | C03C 3/16 106/18.31 |
| 5,750,070 A | 5/1998 | Tang et al. | |
| 5,776,875 A | 7/1998 | Tang et al. | |
| 5,840,638 A * | 11/1998 | Cao | C03C 1/002 501/45 |
| 5,840,658 A | 11/1998 | Rosario et al. | |
| 5,893,416 A | 4/1999 | Read | |
| 5,976,414 A | 11/1999 | Bedford et al. | |
| 6,077,440 A | 6/2000 | Roe et al. | |
| 6,209,646 B1 | 4/2001 | Reddy et al. | |
| 6,232,419 B1 | 5/2001 | Duggirala et al. | |
| 6,267,897 B1 | 7/2001 | Robertson et al. | |
| 6,572,789 B1 | 6/2003 | Yang et al. | |
| 6,787,506 B2 | 9/2004 | Blair et al. | |
| 6,808,557 B2 | 10/2004 | Holbrey et al. | |
| 7,195,070 B2 | 3/2007 | Delaloye et al. | |
| 7,419,937 B2 | 9/2008 | Rimmer et al. | |
| 7,451,823 B2 | 11/2008 | Wilson | |
| 7,491,682 B2 | 2/2009 | Gupta et al. | |
| 7,493,955 B2 | 2/2009 | Gupta et al. | |
| 7,503,389 B2 | 3/2009 | Delaloye et al. | |
| 7,896,068 B2 | 3/2011 | Lee | |
| 7,897,546 B2 | 3/2011 | Showalter et al. | |
| 7,902,127 B2 | 3/2011 | Kurian et al. | |
| 7,915,204 B2 | 3/2011 | De Campo et al. | |
| 8,162,054 B2 | 4/2012 | Schultz et al. | |
| 8,334,240 B2 | 12/2012 | Acosta | |
| 8,381,811 B2 | 2/2013 | Keatch et al. | |
| 8,551,925 B2 | 10/2013 | Nguyen et al. | |
| 8,822,390 B2 | 9/2014 | Heath et al. | |
| 8,980,101 B2 | 3/2015 | Musale | |
| 9,090,495 B2 | 7/2015 | Haag et al. | |
| 9,120,965 B2 | 9/2015 | Kurian et al. | |
| 9,193,610 B2 | 11/2015 | Smith et al. | |
| 9,221,700 B2 | 12/2015 | Greene et al. | |
| 9,228,123 B2 | 1/2016 | Song et al. | |
| 2003/0150613 A1 | 8/2003 | Freiter | |
| 2004/0043906 A1 | 3/2004 | Heath et al. | |
| 2004/0084186 A1 | 5/2004 | Allison et al. | |
| 2005/0027048 A1 | 2/2005 | Nakagawa et al. | |
| 2011/0012703 A1 | 1/2011 | Menard et al. | |
| 2011/0127039 A1* | 6/2011 | Garcia-Lopez De Victoria | C09K 8/528 166/308.1 |
| 2011/0162841 A1 | 7/2011 | Wilson | |
| 2012/0012326 A1 | 1/2012 | Darby et al. | |
| 2012/0080641 A1 | 4/2012 | Relenyi | |
| 2013/0255951 A1 | 10/2013 | Little et al. | |
| 2014/0042075 A1 | 2/2014 | Ding et al. | |
| 2014/0305650 A1 | 10/2014 | Song et al. | |
| 2015/0148266 A1 | 5/2015 | Webber et al. | |

FOREIGN PATENT DOCUMENTS

| | | |
|---|---|---|
| EP | 0 108 685 A2 | 5/1985 |
| EP | 0 365 237 A2 | 4/1990 |
| EP | 0 632 692 B1 | 6/1996 |
| GB | 1 078 765 A | 8/1967 |
| RU | 2149219 C1 | 5/2000 |
| WO | 2012/177568 A1 | 12/2012 |
| WO | 2014/186174 A1 | 11/2014 |
| WO | 2015/087345 A1 | 6/2015 |

OTHER PUBLICATIONS

Brow, Nature of Alumina in Phosphate Glass: I, Properties of Sodium Aluminophosphate Glass, J. Am. Ceram. Soc., 76 (4), 1993, pp. 913-918.

Brow, Nature of Alumina in Phosphate Glass: II, Structure of Sodium Aluminophosphate Glass, J. Am. Ceram. Soc., 76 (4), 1993, pp. 919-928.

Gomez et al., "Characterization of Polyphosphate Glasses Preparation Using CRTA," Journal of Thermal Analysis, vol. 49, 1997 pp. 1171-1178.

Schneider et al., "Local Structure of Sodium Aluminum Metaphosphate Glasses," J. Am. Ceram. Soc., 86 (2), 2003, pp. 317-324.

Shan et al., "Dissolution Products of a Phosphate Glass Scale Inhibitor and Its Scale Inhibition Mechanism," Glass Technol., 42 (4/5), 2001, pp. 122-125.

International Search Report and Written Opinion issued for PCT/US2016/064559, dated Mar. 20, 2017, 12 pages.

Bhardwaj, P., et al., "Polyacrylamide and Poly(acrylamide-co-2-acrylamido-2-methyl-1-propanesulfonic acid)-Silica Composite Nanogels Through in situ Microemulsion Polymerisation," Journal of Materials Science, Feb. 2010, pp. 1008-1016, vol. 45.

Coating Place Inc., Wurster Process Applications, accessed from </wurster-process-applications/wurster-process-applications.html> on Jan. 21, 2016, 3 pages.

Coating Place Inc., The Wurster Process, access from </technologies/the-wurster-process.html> on Jan. 21, 2016, 3 pages.

Powell, R. J., et al., "SPE 28999, Controlled-Release Scale Inhibitor for Use in Fracturing Treatments," Society of Petroleum Engineers, 1995, 9 pages.

Powell, R. J., et al., "SPE 30700, Encapsulated Scale Inhibitor for Use in Fracturing Treatments," Society of Petroleum Engineers, 1995, 7 pages.

\* cited by examiner

CONTROLLED RELEASE SOLID SCALE INHIBITORS

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates to controlled release scale inhibitors and their preparation and use in hydraulic fracturing operations in oil and gas wells. More particularly, to modified polyphosphate glasses having predetermined dissolution rates and their preparation and use for controlled release of solid scale inhibitors in oil and gas well hydraulic fracturing operations.

BACKGROUND OF THE INVENTION

It is common in industrial hydraulic fracturing activities to utilize water or aqueous mixtures in the extraction of product. Such fluids are used in various fluid pathways of a hydraulic fracturing system, which include conduits of wellheads and various production tubulars and of deposit or reservoir wellbores, including distant cracks and fractures in the rock of the deposit or reservoir. A common problem encountered is the formation of scale on the inside surfaces of such conduits. Water or aqueous mixtures can contain a variety of alkaline earth metal cations, such as calcium, barium and strontium as well as a variety of anions such as bicarbonate, carbonate, sulfate, phosphate and silicate. When such ions are present in sufficient concentrations, they can combine to form precipitates. Scale, formed by the deposition of any of several types of such precipitates can coat surfaces in contact with the water or aqueous mixtures. Buildup of such scale on inside surfaces of conduits can, among other things, obstruct fluid flow. Common scales include Calcite, Barite, Celestite, Anhydrite, Gypsum, Iron sulfide, Halite and various "Exotic" scales, such as calcium fluorite, zinc sulfide, and lead sulfide sometimes found with high temperature/high pressure (HT/HP) wells.

The petroleum industry technique known as hydraulic fracturing or, more informally, "hydrofracking" and "fracking," is a widely used and effective method of enhancing the recovery of oil and natural gas from deposits or reservoirs once thought to be difficult or impossible to develop economically. Hydraulic fracturing has been employed in combination with both vertical and horizontal drilling.

Hydraulic fracturing involves injecting a mixture of water, sand or sand-sized particles, and chemical additives into a subsurface petroleum reservoir at high pressure. Injection pressures create small interconnected cracks in the rock and hold open small fractures, about as wide as one or two grains of sand, in the vicinity of the well. These fractures serve as fluid pathways in the reservoir, permitting the fluids in the reservoir to flow more readily to the wellbore.

Scale inhibitors are used in such production wells to prevent scaling in the formation and/or in the production lines downhole and at the surface. Scale build-up decreases permeability of the formation, reduces well productivity and shortens the lifetime of production equipment. In order to clean scales from wells and equipment it is necessary to stop the production which is both time-consuming and costly.

Current scale inhibitors and methods of using such scale inhibitors have the disadvantage of the difficulty in releasing the inhibitor into the well over a sustained period of time. As a result, treatments must repeatedly be undertaken to ensure that the requisite level of inhibitor is continuously present in the well. Such treatments result in lost production revenue due to down time.

Scale prevention is important to ensure continuous production from existing reserves. Scale inhibitors and treatment methods for oil and/or gas wells are therefore sought that provide scale inhibiting chemicals that may be released over a sustained period of time. It is desired that such methods not require continuous attention of operators over prolonged periods.

Extensive efforts have been invested into finding chemical additives and methods limiting the dissolution rate of the inhibiting chemicals to achieve the optimal economic recovery of oil or gas. Such efforts continue, indicating a clear need for scale inhibitors and methods of using such inhibitors that exhibit slower, sustained release in the high temperature environment of hydraulically fractured oil and gas wells.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR § 1.56(a) exists.

BRIEF SUMMARY OF THE INVENTION

The present invention relates to methods of making and using scale inhibitor compositions adapted for controlled release of chemical inhibitors for inhibiting solid scale in hydraulic fracturing treatment of oil and/or gas wells. In some embodiments, an amount of the controlled release scale inhibitor is introduced into induced hydraulic fractures in hydraulic fracturing treatment of oil and/or gas wells. In at least some embodiments, the controlled release scale inhibitor comprises one or more modified polyphosphate glasses. In some embodiments, the polyphosphate glass is modified as a slowed release polyphosphate glass, and in further embodiments, the polyphosphate glass is modified as an accelerated release polyphosphate glass. In still further embodiments, the polyphosphate glass is modified to exhibit a compound dissolution rate.

In at least some embodiments, the present invention discloses scale inhibitor for inhibiting scale in induced hydraulic fractures in hydraulic fracturing treatment of oil and/or gas wells comprising a polyphosphate glass component. The polyphosphate glass component comprises a modified polyphosphate glass, wherein the modified polyphosphate glass comprises a calcium compound, a magnesium compound and one or more controlled release additives. The scale inhibitor, when introduced into a wellbore, exhibits controlled release of inhibiting chemicals over a predetermined period of time in correlation with the one or more controlled release additives included in the modified polyphosphate glass.

In these and other various embodiments, the modified polyphosphate glass is the reaction product of mixing and melting pre-heating components. The pre-heating components comprise 1-20 wt % one or more controlled release additives, a calcium containing compound and a magnesium containing compound. The reaction product being further heated producing a second reaction and forming a glassy melt, wherein the glassy melt is cooled to form an amorphous glass.

In various embodiments, the modified polyphosphate glass is a slowed release polyphosphate glass, wherein the one or more controlled release additives is one or more slowed release additive compounds. The one or more slowed release additive compounds comprises one or more aluminum containing compounds chosen from the group consisting of: alumina, aluminum hydroxide, aluminium oxide hydroxide, naturally occurring or synthetic alumina-containing minerals and their polymorphs, aluminate salts and their polymorphs, organic aluminums and combinations thereof.

In further various embodiments, the modified polyphosphate glass is an accelerated release polyphosphate glass, wherein the one or more controlled release additives is one or more accelerated release additive compounds. In this and various other embodiments, the one or more accelerated release additive compounds is chosen from the group consisting of: silica, cyclic siloxanes, silicate salts (both the ortho and meta variations), zinc oxides, zinc salts, and combinations thereof.

In further exemplary embodiments, the calcium containing compound can be chosen from the group consisting of calcium hydroxide, calcium oxide, calcium carbonate, or mixtures thereof; and the magnesium containing compound can be chosen from the group consisting of magnesium hydroxide, magnesium oxide, magnesium carbonate, or mixtures thereof.

In at least some embodiments, the pre-heating components can further comprise a phosphorous compound and a high-pH alkaline chemical. In various exemplary embodiments, the phosphorous compound is chosen from the group consisting of phosphoric acid, polyphosphoric acid, phosphates (salts or esters), phosphonate, sodium hexametaphosphate and aluminum metaphosphate; and the high-pH alkaline chemical can be chosen from the group consisting of sodium carbonate, sodium hydroxide and mixtures thereof.

In various embodiments, the modified polyphosphate glass is a slowed release polyphosphate glass, wherein the aluminum containing compound is alumina or aluminum hydroxide. In some embodiments, the pre-heating components comprise 2-10 wt % alumina or aluminum hydroxide. In further embodiments, the pre-heating components comprise 3-6 wt % alumina or aluminum hydroxide.

In other various embodiments, the modified polyphosphate glass is an accelerated release polyphosphate glass, wherein the one or more accelerated release additive compounds is silica. In some embodiments, the pre-heating components comprise 2-10 wt % silica. In further embodiments, the pre-heating components comprise 3-6 wt % silica.

In at least some embodiments, the polyphosphate glass component comprises a blend of a plurality of modified polyphosphate glasses. The plurality of modified polyphosphate glasses can include at least one slowed release polyphosphate glass and at least one accelerated release polyphosphate glass. In this and other various embodiments, the blend of a plurality of modified polyphosphate glasses can be adapted to exhibit a compound rate of dissolution.

There is further disclosed herein methods of preparing the scale inhibitor above and otherwise herein for inhibiting scale in induced hydraulic fractures in hydraulic fracturing treatment of oil and/or gas wells. The scale inhibitor comprises a polyphosphate glass component which comprises a modified polyphosphate glass and, in some embodiments, two or more modified polyphosphate glasses.

In at least some embodiments, the method comprises preparing the modified polyphosphate glass by mixing pre-heating components to form a slurry. The pre-heating components, in at least some embodiments, comprise a phosphorous compound; a high-pH alkaline chemical; and 1-20 wt % of: one or more controlled release additives. The mixing of the pre-heated components produces a first reaction. The slurry of pre-heated components is thereafter heated to produce a second reaction and to form a glassy melt. The glassy melt is then cooled, forming an amorphous glass.

In some embodiments, the modified polyphosphate glass is prepared as a slowed release polyphosphate glass, wherein the one or more controlled release additives is one or more slowed release additive compounds comprising one or more aluminum containing compounds. The one or more slowed release additive compounds comprises one or more aluminum containing compounds chosen from the group consisting of: alumina, aluminum hydroxide, aluminium oxide hydroxide, naturally occurring or synthetic alumina-containing minerals and their polymorphs, aluminate salts and their polymorphs, organic aluminums and combinations thereof.

In further various embodiments, the modified polyphosphate glass is prepared as an accelerated release polyphosphate glass, wherein the one or more controlled release additives is one or more accelerated release additive compounds. In this and various other embodiments, the one or more accelerated release additive compounds is chosen from the group consisting of: silica, cyclic siloxanes, silicate salts (both the ortho and meta variations), zinc oxides, zinc salts, and combinations thereof.

In further exemplary embodiments, the calcium containing compound can be chosen from the group consisting of calcium hydroxide, calcium oxide, calcium carbonate, or mixtures thereof; and the magnesium containing compound can be chosen from the group consisting of magnesium hydroxide, magnesium oxide, magnesium carbonate, or mixtures thereof.

In at least some embodiments, the pre-heating components can further comprise a phosphorous compound and a high-pH alkaline chemical various exemplary embodiments, the phosphorous compound is chosen from the group consisting of phosphoric acid, polyphosphoric acid, phosphates (salts or esters) and phosphonate; and the high-pH alkaline chemical can be chosen from the group consisting of sodium carbonate, sodium hydroxide and mixtures thereof.

In various embodiments of the methods, the modified polyphosphate glass is a slowed release polyphosphate glass, wherein the aluminum containing compound is alumina or aluminum hydroxide. In some embodiments, the pre-heating components comprise 2-10 wt % alumina or aluminum hydroxide. In further embodiments, the pre-heating components comprise 3-6 wt % alumina or aluminum hydroxide.

In other various embodiments of the methods, the modified polyphosphate glass is an accelerated release polyphosphate glass, wherein the one or more accelerated release additive compounds is silica. In some embodiments, the pre-heating components comprise 2-10 wt % silica. In further embodiments, the pre-heating components comprise 3-6 wt % silica.

In at least some embodiments of the methods, the polyphosphate glass component comprises a blend of a plurality of the modified polyphosphate glasses. The plurality of modified polyphosphate glasses can include at least one slowed release polyphosphate glass and at least one accelerated release polyphosphate glass. In this and other various embodiments, the blend of a plurality of modified polyphosphate glasses can be adapted to exhibit a compound rate of dissolution.

In these and other various embodiments, the modified polyphosphate glass can consist essentially of the calcium containing compound, the magnesium containing compound, a phosphorous compound, a high-pH alkaline chemical and the one or more controlled release additives. In these and various other embodiments, the modified polyphosphate glass is a slowed release polyphosphate glass and the one or more controlled release additives is alumina or aluminum hydroxide; or an accelerated release polyphosphate glass and the one or more controlled release additives is silica.

In at least one embodiment, there is disclosed herein a scale inhibitor comprising a polyphosphate glass, wherein the polyphosphate glass comprises one or more aluminum containing compounds. The polyphosphate glass is the reaction product of mixing and melting a combination of pre-heating components. The pre-heating components comprise 1-20 wt % alumina, aluminum hydroxide or mixtures thereof; 65-75% phosphoric acid (80%), polyphosphoric acid (80%) or mixtures thereof; 5-10 wt % sodium carbonate, sodium hydroxide or mixtures thereof; 6-12 wt % calcium hydroxide, calcium oxide, calcium carbonate, or mixtures thereof; and 5-10 wt % magnesium hydroxide, magnesium oxide, magnesium carbonate or mixtures thereof. The scale inhibitor is in the form of amorphous glass particles sized such that they may be placed into hydraulically generated fractures. In some embodiments, the pre-heating components comprise 2-10 wt % alumina, and in some embodiments 3-6 wt %. The scale inhibitor is suitable for hydraulically fractured wells and exhibits a reduced dissolution rate profile compared to an equal amount of essentially the same scale inhibitor without the one or more aluminum containing compound.

There is further disclosed herein methods of preparing a scale inhibitor, as disclosed in embodiments above and otherwise herein. In various embodiments, the method comprises mixing the pre-heating components to form a slurry, whereby the pre-heating components undergo a first reaction. In these and other various embodiments, the components can be mixed to form a homogeneous slurry. In some embodiments, the slurry can be filtered to remove particulates.

In these and other various exemplary embodiments, the slurry is then heated to a high temperature to form a glassy melt. In at least some embodiments, the slurry is heated to a temperature of at least 1100° C. During the heating, components of the slurry undergo a second reaction. The glassy melt is then cooled, thereby forming an amorphous glass. In some embodiments, the glassy melt is cooled at a rate of at least 150° C./min.

In various exemplary embodiments, the method can further comprises grinding the amorphous glass to an average size such that they may be placed into hydraulically generated fractures, in some embodiments, along with various proppants.

In these and other various embodiments, the polyphosphate glass is in the form of amorphous glass particles which are sized for insertion into fractures of hydraulically fractured wells. In some embodiments, the amorphous glass particles can be sized to be at least 100 mesh. In further embodiments, the amorphous glass particles can be sized to be at least 30 mesh. In some embodiments, amorphous glass particles have an average size of about 150 μm to about 2,000,000 μm.

In at least some embodiments, there is further disclosed herein a method of treating a fractured wellbore using a scale inhibitor of the present invention comprising the amorphous glass particles. In at least one embodiment, the scale inhibitor of the present invention comprising amorphous glass particles prepared by the methods disclosed herein can be mixed or blended with one or more proppants to form a mixture. The mixture can be injected under pressure into hydraulically generated fractures of a wellbore for inhibiting scale.

In at least some embodiments, the modified polyphosphate glass is a slowed release polyphosphate glass and the polyphosphate glass component exhibits a reduced rate of dissolution as compared to an equal amount of essentially the modified polyphosphate glass without the one or more aluminum containing compound.

In application, the amorphous glass particles of the scale inhibitor can be utilized with intended controlled release effect in environments having elevated, moderate or low temperatures. Elevated temperatures include at least 200° F.; moderate temperatures include 150-200° F.; and low temperatures include temperatures less than 150° F. In at least one embodiment, the amorphous glass particles of the scale inhibitor can be utilized with intended controlled release effect in environments having temperatures up to 450° F., and maintain its rate of dissolution.

The scale inhibitor, as the polyphosphates slowly dissolve, further provides prolonged protection against a range of common oilfield scales, including, for example, Calcite, Barite, Celestite, Anhydrite, Gypsum, Iron sulfide, Halite and various "Exotic" scales, such as calcium fluorite, zinc sulfide, and lead sulfide sometimes found with high temperature/high pressure (HT/HP) wells.

The above summary of various aspects of the disclosure is not intended to describe each illustrated aspect or every implementation of the disclosure. While multiple embodiments are disclosed, still other features, embodiments and advantages of the present invention will become apparent to those skilled in the art from the following detailed description, which shows and describes illustrative embodiments of the invention. Accordingly, the detailed description is to be regarded as illustrative in nature and not restrictive.

BRIEF DESCRIPTION OF THE DRAWINGS

A detailed description of the invention is hereafter described with specific reference being made to the drawings in which.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

Figure 1:
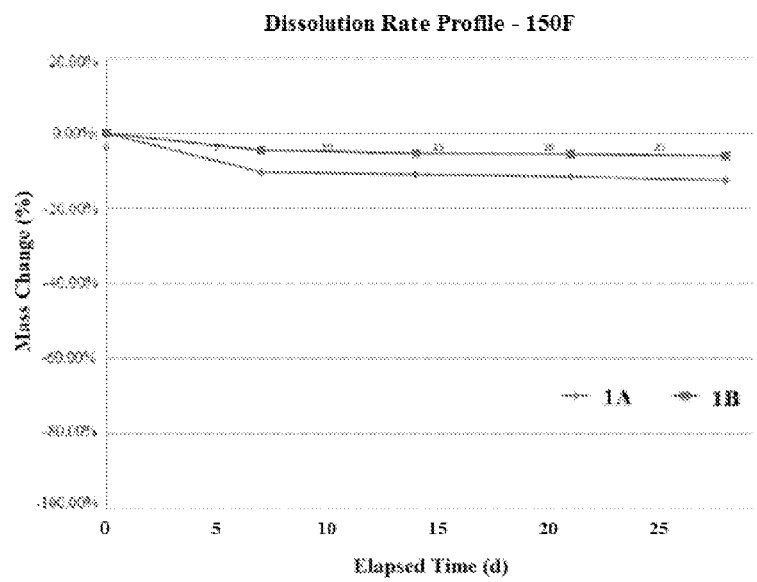
FIGS. 1-4 are graphs showing a comparative overview of dissolution rates for solid scale inhibitor samples at different temperatures.
Figure 2:
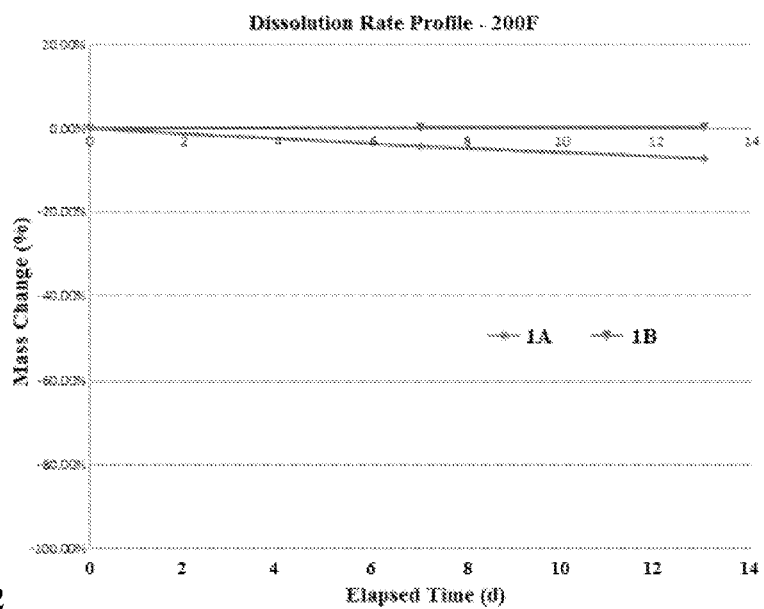
Figure 3:
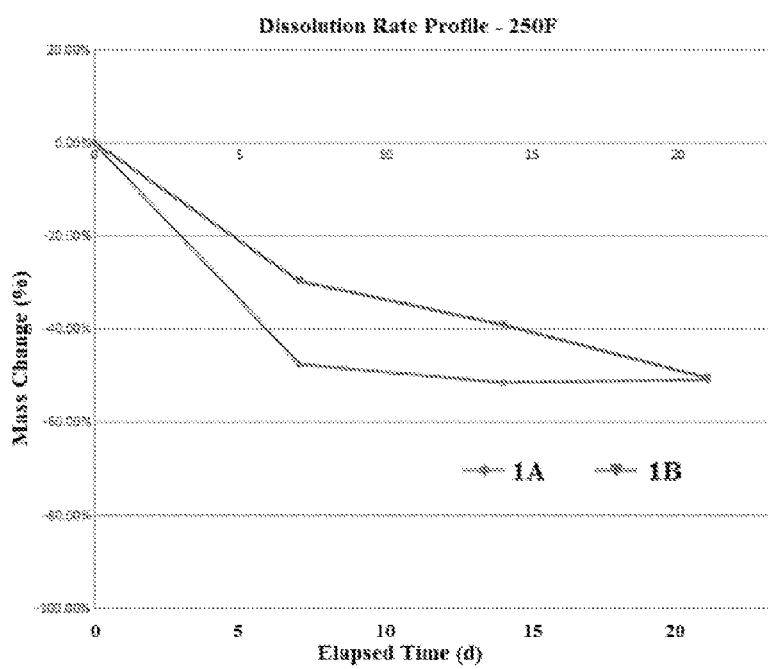
Figure 4:
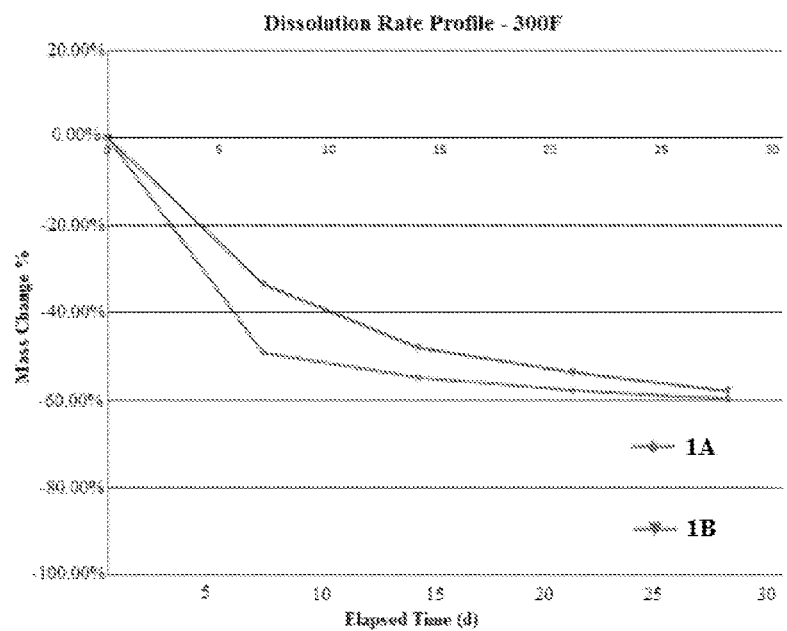

In at least some embodiments, the present invention relates to controlled release scale inhibitor compositions comprising modified polyphosphate glass and methods for their making and use. In various embodiments, the controlled release scale inhibitor is adapted for inhibiting scale in induced hydraulic fractures in hydraulic fracturing treatment of oil and/or gas wells. The scale inhibitor, when introduced, exhibits controlled release of inhibiting chemicals over a predetermined period of time in correlation with one or more controlled release additives included in the modified polyphosphate glass. In some embodiments, polyphosphate glass is modified as a slowed release polyphosphate glass, and in further embodiments, the polyphosphate glass is modified as an accelerated release polyphosphate glass. In further embodiments, the controlled release scale inhibitor compositions comprise blends of slowed release polyphosphate glass and accelerated release polyphosphate glass.

In various exemplary embodiments, the inhibitors are polyphosphate glasses comprising calcium and magnesium compounds, and one or more controlled release additives. In preparation of the modified polyphosphate glass, the combination of one or more controlled release additives, calcium, and magnesium compounds effectuates a more chemically robust glass as compared to glass prepared using the combination of calcium and magnesium compounds without the one or more controlled release additives. In use, the scale inhibitors of the present invention reduce or increase the rate of dissolution, retain scale inhibition behavior, and minimize the need for changes to the plant production process.

Unless otherwise defined herein, all technical and scientific terms used herein have the same meaning as commonly understood by one of ordinary skill in the art. In case of conflict, the present document, including definitions, will control. The following definitions are provided to determine how terms used in this application are to be construed. The organization of the definitions is for convenience only and is not intended to limit any of the definitions to any particular category.

"Alumina" as used herein refers to aluminium oxide and is a chemical compound of aluminium and oxygen with the chemical formula $Al_2O_3$. It is also referred to as aluminium (III) oxide, aloxide, aloxite, and alundum.

"Oilfield" as used herein refers to the surface area overlying an oil reservoir or reservoirs, and the reservoir(s), well(s) and production equipment associated therewith.

"Pipeline" as used herein refers to a tube or system of tubes used for transporting crude oil and natural gas from the field or gathering system to the refinery.

"Production" refers to the phase of the petroleum industry that deals with bringing well fluids or gas to the surface and separating them and storing, gauging and otherwise preparing the product for delivery; also can refer to the amount of oil or gas produced in a given period.

"Production tubing" as used herein refers to a wellbore tubular used to produce reservoir fluids. Production tubing is assembled with other completion components to make up the production string. The production tubing selected for any completion should be compatible with the wellbore geometry, reservoir production characteristics and reservoir fluids.

"Proppant" as used herein refers to a solid material, typically sand, treated sand or man-made ceramic materials, designed to keep an induced hydraulic fracture open, during or following a fracturing treatment. It is added to a frac'ing fluid which may vary in composition depending on the type of fracturing used, and can be gel, foam or slickwater-based.

"Oxide" as used herein refers to a chemical compound that contains at least one oxygen atom and one other element in its chemical formula.

"Tubular" or "Tubulars" as used herein refers to any type of oilfield pipe or oilfield tubular goods, such as drill pipe, drill collars, pup joints, casing, production tubing/line and pipeline or line pipe. The term includes standard and line pipe used in the oil and gas, pipeline, construction, refining, chemical and petrochemical industries for production and transmission of crude oil, natural gas and petroleum products as well as for water and slurry pipeline applications.

"Valve" or Valve component" refers to any device for halting or controlling the flow of a liquid, gas or other material through a passage, pipe, inlet, outlet, etc.

"Wellbore" refers to a borehole; the hole drilled by the bit. A wellbore may have casing in it or it may be open (uncased); or part of it may be cased, and part of it may be open; also called well, borehole or hole.

"Wellhead" refers to the equipment installed at the surface of the wellbore. A wellhead includes such equipment as the casing head and tubing head.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims. All illustrated chemical structures also include all possible stereoisomer alternatives.

While the invention is susceptible of embodiment in many different forms, this disclosure will describe embodiments of the invention with the understanding that the present disclosure is to be considered as an exemplification of the principles of the invention and is not intended to limit the broad aspect of the invention to the embodiments illustrated.

Scale Inhibitor Composition

In various embodiments, the controlled release scale inhibitor composition includes polyphosphate glass(es) modified with one or more controlled release additives for various predetermined rates of dissolution. In some embodiments, the polyphosphate glass is modified as a slowed release polyphosphate glass and the one or more controlled release additives is one or more slowed release additive compounds; in some embodiments, the polyphosphate glass is modified as an accelerated release polyphosphate glass and the one or more controlled release additives is one or more accelerated release additive compounds; and in further embodiments, the controlled release scale inhibitor composition comprises a polyphosphate glass blend modified to exhibit a compound dissolution rate and comprising a plurality of controlled release additives.

In at least some embodiments, the polyphosphate glass of the controlled release scale inhibitor composition is modified as a slowed release polyphosphate glass, comprising one or more slowed release additive compounds. In at least some embodiments, the slowed release polyphosphate glass is the reaction product of mixing and melting pre-heating components. The pre-heating components comprise one or more slowed release additive compounds; a phosphorous compound; a high-pH alkaline compound; a calcium-oxygen containing compound; a magnesium-oxygen containing compound; and water. The pre-heating components undergo a first reaction when mixed and a second reaction when heated and melted, forming a glassy melt. The glassy melt is cooled to form polyphosphate glass and crushed into particles.

In at least some embodiments, the one or more slowed release additive compounds is one or more aluminum containing compounds. The one or more aluminum containing compound comprise 1-20 wt % of the pre-heating components; in some embodiments, 2-10 wt %, and still further, 3-6 wt %. In at least some embodiments, the one or more aluminum containing compound is alumina. Examples of other suitable aluminum containing compound include aluminum hydroxide, 1% basic alumina (Al2O3), aluminium oxide hydroxide, naturally occurring or synthetic alumina-containing minerals, examples of which include corundum, ruby, sapphire, bauxite, gibbsite, boehmite and diaspore and their polymorphs, aluminate salts and their polymorphs, examples of which include aluminum halides, nitrates, phosphate/metaphosphates, and organic aluminums, examples of which include trialkylaluminum compounds.

The phosphorous compound comprises 65-75 wt % of the pre-heating components; and in some embodiments, about 65-70 wt %. In at least some embodiments, the phosphorous compound is phosphoric acid (80%), polyphosphoric acid (80%) or mixtures thereof. Examples of other suitable phosphorous compounds include phosphoric acid, polyphosphoric acid, phosphates (salts or esters), oligophosphates and phosphonate.

The high-pH alkaline compound comprises 5-10 wt % of the pre-heating components; and in some embodiments, about 6-7 wt %. In at least some embodiments, the high-pH alkaline compound is sodium carbonate, sodium hydroxide or mixtures thereof. In some embodiments, the high-pH alkaline compound is dense sodium carbonate.

The calcium-oxygen containing compound comprises 6-12 wt % of the pre-heating components; and in some embodiments, about 7-10 wt %. In at least some embodiments, calcium-oxygen containing compound is calcium hydroxide, calcium oxide, calcium carbonate, or mixtures thereof. In some embodiments, the calcium-oxygen containing compound is calcium hydroxide (Hydrated).

The magnesium-oxygen containing compound comprises 5-10 wt % of the pre-heating components; and in some embodiments, about 6-7 wt %. In at least some embodiments, magnesium-oxygen containing compound is magnesium hydroxide, magnesium oxide, magnesium carbonate or mixtures thereof. In some embodiments, the magnesium-oxygen containing compound is magnesium hydroxide (technical grade).

In some embodiments, the pre-heating components are mixed in water. The water can be soft water and can be present in various amounts, including, but not limited to, 1-10 wt % and 4-5 wt %. Water content may be varied as needed to produce slurry with desired rheological and handling properties.

In at least one embodiment, the pre-heating components comprise 2-10 wt % alumina; 65-75 wt % phosphoric acid (80%); 5-10 wt % dense sodium carbonate; 6-12 wt % calcium hydroxide (Hydrated); and 5-10 wt % magnesium hydroxide (technical grade). The pre-heating components undergo a first reaction when mixed and a second reaction when heated and melted, forming a glassy melt. The glassy melt is cooled to form polyphosphate glass and crushed into particles.

In some embodiments, the pre-heating components can further comprise SiO2 (1% SiO2), cyclic siloxane (1% cyclic siloxane), basic zinc carbonate (1% basic zinc carbonate), sodium metasilicate (1% sodium metasilicate), zinc oxide (1% zinc oxide), sodium orthosilicate (1% sodium orthosilicate and sodium orthosilicate (1% sodium orthosilicate))

The controlled release scale inhibitor compositions including a slowed release polyphosphate glass comprising one or more aluminum containing compounds, in at least some embodiments, exhibit reduced and sustained dissolution rate profiles compared to conventional products. For comparison purposes, in at least some embodiments, a slowed release polyphosphate glass in accordance with the present invention dissolves at a rate of loss of less than 60% of the starting total mass over a 28 day period, when heated to 300° F. in deionized water at a concentration of 5 g slowed release polyphosphate glass per 300 mL deionized water. Under the same test conditions, a slowed release polyphosphate glass, in accordance with at least some embodiments, exhibits a dissolution rate of loss of between 10 and 60% of the total mass. In still further embodiments, the slowed release polyphosphate glass exhibits a dissolution rate of loss of between 40 and 55% of the total mass.

In some embodiments, the controlled release scale inhibitor composition comprises a polyphosphate glass modified as an accelerated release polyphosphate glass. In at least some embodiments, the accelerated release polyphosphate glass comprises the components and formulations as described above in regard to the slowed release polyphosphate glass, wherein the one or more slowed release additive compound is replaced with one or more accelerated release additive compounds.

The one or more accelerated release additive compound comprise 1-20 wt % of the pre-heating components; in some embodiments, 2-10 wt %, and still further, 3-6 wt %. In at least some embodiments, the one or more accelerated release additive compound comprise one or more the silicon- or zinc-containing compounds. Examples of suitable silicon- or zinc-containing compounds include silica, cyclic siloxanes, silicate salts (both the ortho and meta variations), zinc oxides, zinc salts, and combinations thereof. In at least one embodiment, the silicon- or zinc-containing compound is silica.

In some embodiments, the accelerated release scale inhibitors are used in oilfield applications wherein temperatures are low or moderate and other conventional available inhibitors release too slowly.

The controlled release scale inhibitor compositions including an accelerated release polyphosphate glass comprising one or more the on- or zinc-containing compounds, in at least some embodiments, exhibits faster dissolution rate profiles compared to conventional products. For comparison purposes, in at least some embodiments, an accelerated release polyphosphate glass in accordance with the present invention dissolves at a rate of loss greater than 20% of the starting total mass over a 28 day period, when heated to 150° F. in deionized water at a concentration of 5 g accelerated release polyphosphate glass per 300 mL deionized water. Under the same test conditions, an accelerated release polyphosphate glass, in accordance with at least some embodiments, exhibits a dissolution rate of loss of between 50 and 100% of the total mass. In still further embodiments, the accelerated release polyphosphate glass exhibits a dissolution rate of loss of between 85 and 100% of the total mass.

In still further embodiments, the controlled release scale inhibitor can be programmed so as to exhibit an adjustable compound dissolution rate. In these and other various embodiments, the controlled release scale inhibitor comprises a blend of various amounts of two or more modified polyphosphate glasses. The blend exhibits dual or multiple dissolution rates which combine to produce a net compound dissolution rate, which includes multiple rate segments that differ in accordance to the composition of the blend.

In an exemplary embodiment, the modified polyphosphate glass blend can comprise an amount of the slowed release polyphosphate glass and an amount of the accelerated release polyphosphate glass. The resulting blend exhibits an initial rate segment which reflects a dissolution rate that is relatively high and thereafter decreases to a following rate segment which reflects dissolution rate that is relatively slow. The compound dissolution rate can be adjusted by adjusting the amounts numbers and formulations of the modified polyphosphate glasses included in the blend.

The net compound dissolution rate produced by the mixture or blend of the different polyphosphate glasses is determined by the total mass loss over time of the controlled release scale inhibitor. As the blend includes amounts of slowed release polyphosphate glass which dissolves more slowly and amounts of accelerated release polyphosphate glass which dissolves more quickly, the net compound dissolution rate is reflected graphically as the combination of a plurality of rate segments primarily representing the differing modified polyphosphate glasses included in the blend.

In at least some embodiments of the blend of controlled release polyphosphate glass comprises an amount of the slowed release polyphosphate glass and an amount of the accelerated release polyphosphate glass, A graphical representation of the net compound dissolution rate of the blend in use would show an initial rate segment having a relatively high negative slope accounting for an initial blast of scale inhibitor attributed to the accelerated release polyphosphate glass component. Contemporaneously, the slowed release polyphosphate glass component dissolves in the background at a slower rate and does not have a substantive effect on the initial rate segment. Once the accelerated release polyphosphate glass completely dissolved, the compound controlled release polyphosphate glass blend concentration would be determined by the dissolution rate of the slowed release polyphosphate glass. This would be reflected in a following rate segment having a relatively low negative slope accounting for a slower, sustained release of scale inhibitor attributed to the slowed release polyphosphate glass component.

In various further embodiments, the blend of controlled release polyphosphate glass can comprise two or more modified and/or non-modified polyphosphate glasses. In at least some embodiments, the blend of controlled release polyphosphate glass comprises a slowed release polyphosphate glass in the amount of 1-99% and an accelerated release polyphosphate glass in the amount of 1-99%. In further embodiments, the amount for each glass is 25-75%. In still further embodiments, the ratio of the fast and slowed release polyphosphate glasses is about 1:1. For these and other various embodiments, an exemplary blend can comprise an accelerated release polyphosphate glass comprising silica and a slowed release polyphosphate glass comprising an aluminum compound.

In further embodiments, the blend of controlled release polyphosphate glass can further comprise a non-modified polyphosphate glass. Examples of a non-modified polyphosphate glass include a commercial product available from Nalco Champion, an Ecolab Company, 3130 FM 521, Fresno, Tex., 77545, under the name ASP529. In at least some embodiments, the blend of controlled release polyphosphate glass comprises a slowed release polyphosphate glass in the amount of 1-99%, an accelerated release polyphosphate glass in the amount of 1-99% and a non-modified polyphosphate glass in the amount of 1-99%. In further embodiments, the amount for each modified glass is 1-98% and the amount for the non-modified polyphosphate glass is 1-5%. In still further embodiments, the ratio of the fast and slowed release polyphosphate glasses and the non-modified polyphosphate glass in the blend is about 1:1:1. For these and other various embodiments, an exemplary blend can comprise an accelerated release polyphosphate glass comprising silica, a slowed release polyphosphate glass comprising an aluminum compound and ASP539.

In these and other various composition embodiments, the modified polyphosphate glass can consists essentially of the calcium containing compound, the magnesium containing compound, a phosphorous compound, a high-pH alkaline chemical and the one or more controlled release additives.

In these and various other embodiments, the scale inhibitor is in the form of amorphous glass particles being sized such that they may be placed into hydraulically generated fractures along with conventional proppants. In some embodiments, amorphous glass particles have an average size of about 150 µm to about 2,000,000 µm.

The scale inhibitor is suitable for hydraulically fractured wells and exhibits a reduced dissolution rate profile compared to an equal amount of essentially the same scale inhibitor without the one or more aluminum containing compound.

In some embodiments, the scale inhibitor composition can include or be combined with one or more further components or ingredients, examples of which include water, solvents, excipients, diluents, and additives, such as biocides, stabilizers, surfactants, corrosion inhibitors, scale inhibitors, and antifoaming agents. Other components or ingredients can further include those commonly used in Industrial Water System formulations, as disclosed in U.S. Patent Publication 20120080641, which is herein incorporated by reference in its entirety.

Method of Making

Methods of preparing the scale inhibitor, as disclosed in embodiments above and otherwise herein include various embodiments. In at least some embodiments, the method comprises mixing the pre-heating components to form a homogeneous slurry, whereby the pre-heating components undergo a first reaction. As an example, wherein the pre-heating components include phosphoric acid, calcium hydroxide, magnesium hydroxide and soda ash, the first reaction can be a simple neutralization of the phosphoric acid with the other included components (calcium hydroxide, magnesium hydroxide and soda ash). In some embodiments, such a first reaction is an exothermic neutralization that produces various phosphate salts and water. In some embodiments, salts of one or more of the pre-heating components can be provided rather than neutralizing the phosphoric acid with the corresponding bases.

In some embodiments, the pre-heating components are mixed in water. The water can be soft water and can be present in various amounts, including, but not limited to, 1-10 wt % and 4-5 wt %. Water content may be varied as needed to produce slurry with desired viscosity. The solubility may be altered by varying the levels of the high-pH alkaline compound, the calcium-oxygen containing compound and/or the magnesium-oxygen containing compound. Higher levels of sodium improve solubility while higher levels of calcium and/or magnesium diminish solubility.

In various embodiments, further components or chemicals can be added. In some embodiments, such further chemicals can include surfactants eliminate foam formation during preparation of the slurry and rheological modifiers to adjust rheological properties of the slurry. Further chemicals can further include coloring agents to produce a desired final color.

The slurry is then heated to a high temperature to form a glassy melt. In at least some embodiments, the slurry is pumped into a high temperature furnace and is heated to a temperature of at least 600° C. In some embodiment, the slurry is heated to a temperature of at least 1100° C. In still further embodiments, the slurry is heated at a range of temperatures between 1500 and 2500° C. The heating and melting may be accomplished in any conventional manner used in the preparation of glasses, including in a furnace, an electric melter, pot furnace or kiln.

The molten glass may be homogenized and bubbles may be removed by stirring the mixture to a consistent thickness.

During the heating, components of the slurry undergo a second reaction and form a glassy melt. In these and other various exemplary embodiments, the glassy melt is cooled or annealed, thereby forming an amorphous glass. The rate of cooling the glassy melt can vary. In some embodiments, the glassy melt is cooled at a rate of at least 150° C./min. In some embodiments, the glass is cooled as rapidly as practically possibly so as so as to prevent crystallization and/or phase separation.

The heated and cooled composition forms a polyphosphate glass product. In some embodiments, the product is an amorphous, glassy product with a complex chemical and physical structure. The polyphosphate glassy product can be in the form of a sheet.

Further in the methods, the resulting polyphosphate amorphous glass product can be processed by crushing and grinding and sieving to glass particles of a desired sized. In some embodiments, the glass particles of the final product are of an average size that may be placed into hydraulically generated fractures. In some embodiments, various proppants are included. The polyphosphate amorphous glass can be crushed/ground and sieved to a grain consistency, using, for example, grinders and/or crushers. In some embodiments, the resulting grain/particle size can be at least 100 mesh. Further exemplary embodiments include ranges of 10-70 mesh, 10-30 mesh and 40-70 mesh. The size range is a function of the grinding and sieving methods used and can be adjusted to suit the particular application.

The glass particles form a slow-release material that has both scale inhibition properties and exhibits a reduced dissolution rate profile compared to an equal amount of essentially the same material without the one or more aluminum containing compound. The rate of dissolution of the amorphous glass particles is maintained at elevated, moderate or low temperatures. Elevated temperatures include at least 200° F.; moderate temperatures include 150-200° F.; and low temperatures include temperatures less than 150° F. In at least one embodiment, the amorphous glass particles of the scale inhibitor can be utilized with intended controlled release effect in environments having temperatures up to 450° F., and maintain its rate of dissolution.

In other various embodiments, it is contemplated herein that the amorphous glass product is not ground or crushed and remains in the form of much larger pieces. Such pieces can be positioned somewhere in a well other than hydraulically generated fractures that are much larger. Non-limiting examples of such places include somewhere in the wellbore casing or the rathole. Hence, in some embodiments, the amorphous glass product is in the form of pieces having a size of 1 cm or more; in some embodiments, 10 cm or more; and, in still further embodiments, 100 cm or more.

In at least some embodiments, the modified polyphosphate glass of a controlled release scale inhibitor used can be prepared as a dry product of various forms, for example, beads, granules, or particles The product has the advantage that it can be pumped and handled as a solid in fracturing operations and can be packaged.

In these and other various embodiments, the same or differing amounts of two or more modified polyphosphate glasses having different compositions can be pre-blended to form a controlled release scale inhibitor blend. The blend of modified glasses, as discussed above, provides a net effect that has a much wider dissolution profile. Controlled release scale inhibitor blends can be programmed or formulated so as to provide various desired dissolution profiles for various predetermined applications. As an example, in the application of a controlled release scale inhibitor blend comprising a mixture of a silica-containing polyphosphate bead and an alumina-containing polyphosphate bead, the silica-containing polyphosphate would dissolve relatively fast and give my well short term protection against scale. After that product had substantially dissolved, the alumina-containing polyphosphate would take over and provide longer term protection. The blending would be done with the idea of achieving short-, mid- and long-term protection with the various compositions or blends.

In at least one embodiment, the present invention includes a commercial package containing a composition comprising polyphosphate glass, the polyphosphate glass comprising a dissolution rate modifier and printed material. In at least some embodiments, the printed material indicates that the composition is a scale inhibitor. In some embodiments, the dissolution modifier is one or more aluminum containing compound, and the scale inhibitor has a reduced dissolution rate profile compared to an equal amount of essentially the scale inhibitor without the one or more aluminum containing compound. In at least some embodiments, the composition is a polyphosphate glass in accordance with embodiments disclosed herein. In these and other various embodiments, the printed material indicates blending instructions for preparing a proppant.

In some embodiments, the polyphosphate glass is the reaction product of mixing and melting pre-heating components comprising 1-20 wt % aluminum containing compound, a calcium containing compound and a magnesium containing compound. The aluminum containing compound is chosen from the group consisting of: alumina, aluminum hydroxide, aluminium oxide hydroxide, naturally occurring or synthetic alumina-containing minerals and their polymorphs, aluminate salts and their polymorphs and organic aluminums. The printed material indicates the use of the composition as a scale inhibitor in an oil and/or gas well hydraulic fracturing process. The printed material can further provide or direct a user to instructions for use of the composition. The instructions can indicate one or more methods for using the polyphosphate glass composition, which can include one or more methods for inhibiting scale in a hydraulic fracturing process for production of oil and/or gas at a production site, as is disclosed herein.

In at least one embodiment, the present invention is directed to a method of marketing the polyphosphate glass composition, comprising packaging the polyphosphate glass composition along with labeling that identifies the polyphosphate glass composition as being useful as a scale inhibitor in the oil and/or gas hydraulic fracturing process.

In at least one embodiment, In at least some embodiments, the modified polyphosphate glass of a controlled release scale inhibitor used can be prepared as a dry product of various forms, for example, beads, granules, or particles The product has the advantage that it can be pumped and handled as a solid in fracturing operations and can be packaged.

In these and other various embodiments, the controlled release scale inhibitor comprising modified polyphosphate glass or blended modified polyphosphate glasses in solid state can be pre-blended with conventional proppant to form a proppant mixture. The proppant mixture can be packaged with an identifying label. Various proppant mixtures can be prepared and package with formulations consistent with conventional on-site mixing formulations, such that they are ready for use.

In these and other various embodiments, the controlled release scale inhibitor (sometimes referred to as modified polyphosphate glass or polyphosphate glass) comprises a blend of modified polyphosphate glasses, as described above.

In these and other various method embodiments, the modified polyphosphate glass can consists essentially of the calcium containing compound, the magnesium containing compound, a phosphorous compound, a high-pH alkaline chemical and the one or more controlled release additives.

Methods of Use of Scale Inhibitor

There is further disclosed herein methods of treating a fractured wellbore using the amorphous glass particles of the scale inhibitor, as disclosed in embodiments above and otherwise herein. In various embodiments, the method comprises mixing the amorphous glass particles with one or more proppants to form a mixture. The mixture can include water, sand or sand-sized particles, and various other chemical additives. The inhibitor or the mixture can be introduced into a production wellbore. In some embodiments, when hydraulic fracturing has been employed, in both vertical and horizontal drilling, the mixture is introduced under pressure, into fractured fissures of the wellbore.

In some embodiments, the inhibitor according to the present invention can be forced into the formation by application of hydraulic pressure from the surface which forces the inhibitor into a targeted zone. In some cases, such treatments are performed at downhole injection pressures below that of the formation fracture pressure. Alternatively, a delivery method may consist of placing the solid inhibitor into the producing formation in conjunction with a hydraulic fracturing operation. This method places the inhibitor in contact with the fluids contained in the formation before such fluids enter the wellbore where scaling is commonly encountered.

In some embodiments, in cases involving hydraulic fracturing, application involves injecting the mixture into a subsurface petroleum reservoir at high pressure. Injection pressures create small interconnected cracks in the rock and hold open small fractures, about as wide as one or two grains of sand, in the vicinity of the well. These fractures serve as fluid pathways in the reservoir, permitting the fluids in the reservoir to flow more readily to the wellbore.

When in place, the inhibitor is released over a sustained period of time, providing prolonged protection. Less frequent shut downs and added treatments are undertaken than conventional methods to ensure that the requisite level of inhibitor is continuously present in the well. This lessens lost production revenue due to down time. The sustained level of concentration of solid scale inhibitor due to the slowed release is such that scale inhibitor is also released into the flowback to treat scale in the fracturing fluid water.

Although in some embodiments of the present invention the inhibitor of the present invention can be applied in continuous feeding which can be periodically shut down to remove existing scale and to add a new dose/aliquot of the inhibitor, the slow, sustained release exhibited by the inhibitor of the present invention provides greater overall efficiency than the continuous chemical injection and/or frequent shut downs required with conventional methods and compositions.

Application amounts can vary according on a case by case basis and adjusted as necessary according to perceived results. In an exemplary embodiment, the concentration of modified polyphosphate in the total amount of proppant placed into a fracture is 0.001% to 50% by weight. In a further exemplary embodiment, the concentration of modified polyphosphate is 0.1 to 20% by weight. In a still further exemplary embodiment, the concentration of modified polyphosphate is 1 to 10% by weight. In some embodiments, the scale inhibitor according to the invention is substantially free of solvents or surfactants. This is an advantage over liquid scale inhibitors in applications where very little reservoir water is produced.

In application, the rate of dissolution of amorphous glass particles of the scale inhibitor, in at least some embodiments disclosed herein, is maintained at temperatures of at least 200° F. as well as moderate or low temperatures. Elevated temperatures include at least 200° F.; moderate temperatures include 150-200° F.; and low temperatures include temperatures less than 150° F. In at least one embodiment, the amorphous glass particles of the scale inhibitor can be utilized with intended controlled release effect in environments having temperatures up to 450° F., and maintain its rate of dissolution.

In these and other various embodiments, the scale inhibitor provides prolonged protection against a range of common oilfield scales, as the polyphosphates slowly dissolve. Common oilfield scales can include Calcite, Barite, Celestite, Anhydrite, Gypsum, Iron sulfide, Halite and various "Exotic" scales, such as calcium fluorite, zinc sulfide, and lead sulfide sometimes found with high temperature/high pressure (HT/HP) wells.

The compositions and methods of present invention provide advantages over current techniques at least in that dissolution rate of the scale inhibitor is reduced, while scale inhibition behavior is retained. Such methods and compositions improve efficiency and reduce costs with minimal changes to the plant production process.

Scale formation (particularly calcite and barite) is a ubiquitous challenge in any area where water/brines are part of a process. Processes that incorporate water temperature or pressure changes (e.g., heat exchangers, cooling towers, etc.) or mixing of waters that have different salt contents are particularly prone to scale formation. In various further embodiments, the inhibitor compositions and methods of the present invention can be utilized in such applications. Other applications include Industrial Water Systems, transportation pipelines, water softeners and waste water treatment equipment.

Examples of Industrial Water Systems include, but is not limited to cooling towers, paper mills, metal working fluids, metal and/or mineral mining systems, heat exchangers, reinjection water such as produced water from oil production, flooding water used in secondary oil recovery, geothermal systems, fluid coolers, hydrotesting of pipelines, water treatment or purification plants and equipment, including reverse osmosis membranes, ultrafiltration or ion exchange.

Without being limited by a particular theory or design of the invention or of the scope afforded in construing the claims, it is believed that the aluminum containing compound(s) strengthens the bonding in the polyphosphate network, resulting in a reduced rate of dissolution.

Various patents and publications are listed below. Methods, terms, tools, materials and teachings disclosed in referenced patents and publications and any others that are otherwise referenced below or otherwise in this disclosure are herein incorporated only to the extent that they complement or expand the understanding and scope of the embodiments and claims of the presently disclosed invention and do not contradict or are inconsistent with such understanding and scope. Referenced patents and publications include: U.S. Pat. Nos. 8,822,390, 6,077,440, 5,399,270, 5,141,655, 5,112,496, 4,234,511, 4,187,245, 4,080,375, 4,051,110, 3,720,505, 3,432,428, 3,338,670; and US Patent Publication Nos. 20140042075, 20110162841, 20110073802, 20060124301 and 20060124302. The art described herein is not intended to constitute an admission that any patent, publication or other information referred to herein is "prior art" with respect to this invention, unless specifically designated as such. In addition, this should not be construed to mean that a search has been made or that no other information as defined in 37 CFR §1.56(a) exists.

EXAMPLES

The foregoing may be better understood by reference to the following examples, which are presented for purposes of illustration and are not intended to limit the scope of the invention. In particular, the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

For purposes of illustration and not intended to limit the scope of the invention, a study was conducted to illustrate the reduction in dissolution rate provided by the compositions of the present invention over equal amounts of essentially the scale inhibitor without the one or more aluminum containing compound.

Dissolution rate profiles were generated on two samples. Sample 1A, as shown in FIGS. 1-4, is a sample of a commercial product available from Nalco Champion, an Ecolab Company, 3130 FM 521, Fresno, Tex., 77545, under the name ASP529. Sample 1B, as shown in FIGS. 1-4, is a sample in equal amount of a polyphosphate glass inhibitor modified as a slowed release polyphosphate glass made in accordance with the present invention, the formulation of which is shown in Table 1. Shown in Table 1 are the pre-heating components of the polyphosphate glass inhibitor of Sample 1B.

TABLE 1

| Pre-heating Component | wt % |
|---|---|
| Phosphoric acid, 80% | 68.34 |
| Dense soda ash | 6.54 |

TABLE 1-continued

| Pre-heating Component | wt % |
|---|---|
| Calcium hydroxide, hydrated | 8.92 |
| Magnesium hydroxide, technical grade | 6.64 |
| Basic alumina ($Al_2O_3$) | 5.0 |
| Soft water | 4.58* |

*Water content may be varied as needed to produce slurry with desired rheological and handling properties.

The components of 1B were processed in accordance with the methods of the present invention. The mixed slurry of the components was heated to a temperature above 1100° C. in a furnace to form a polyphosphate glassy melt. The melt was cooled, forming an amorphous, glassy product. The glassy product was processed by grinding and sieving to produce particles in the size range of 10-30 mesh, which is substantially the same as the defined particle size of Sample 1A.

The polyphosphate dissolution rates for the samples were tested at 150° F., 200° F., 250° F. and 300° F. Resulting data is shown in FIGS. 1-4. The graphs of FIGS. 1-4 show the data from testing at the different temperatures, 150° F., 200° F., 250° F. and 300° F., respectively. As seen, in each instance, Sample 1B consistently showed a rate of mass change that is less than that of Sample 1A. This illustrates that the formulations of the present invention provide for slower release of the polyphosphates and thus a longer lasting scale inhibitor.

Figure 5:
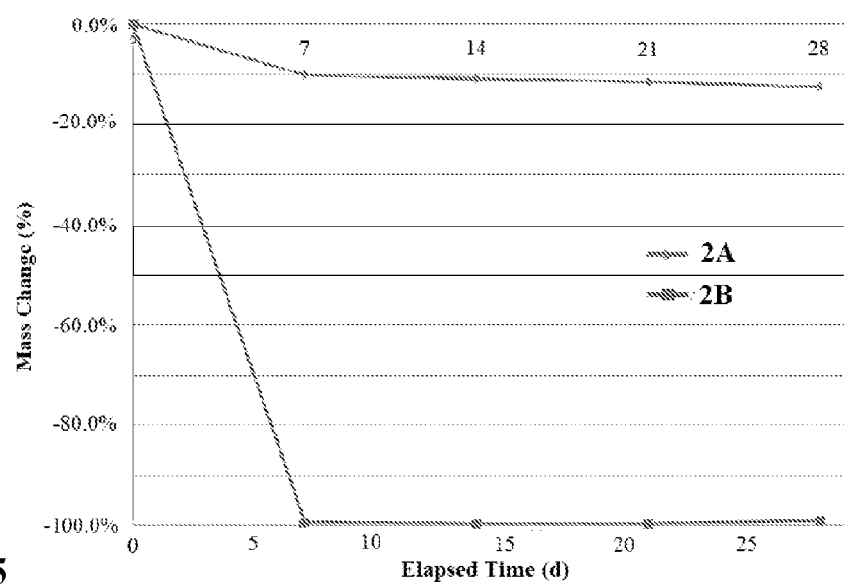
FIG. 5 is a graph showing a comparative overview of dissolution rates for solid scale inhibitor samples.

In further studies, dissolution rate profiles were generated on two samples. Sample 2A, as shown in FIG. 5, is a sample of the same commercial product as Sample 1A above (ASP529). Sample 2B, as shown in FIG. 5, is a sample in equal amount of a polyphosphate glass inhibitor modified as an accelerated release polyphosphate glass made in accordance with the present invention. The formulation of Sample 2B is shown in Table 2A. Shown in Table 2A are the pre-heating components of the polyphosphate glass inhibitor of Sample 2B.

TABLE 2A

| Pre-heating Component | wt % |
|---|---|
| Phosphoric acid, 80% | 68.34 |
| Dense soda ash | 6.54 |
| Calcium hydroxide, hydrated | 8.92 |
| Magnesium hydroxide, technical grade | 6.64 |
| Silica ($SiO_2$) | 5.0 |
| Soft water | 4.58* |

*Water content may be varied as needed to produce slurry with desired rheological and handling properties.

The components of 2B were processes in accordance with the method of the present invention. The mixed slurry of the components was heated to a temperature above 1100° C. in a furnace to form a polyphosphate glassy melt. The melt was cooled, forming an amorphous, glassy product. The glassy product was processed by grinding and sieving to produce particles in the size range of 10-30 mesh, which is substantially the same as the defined particle size of Sample 2A.

The polyphosphate dissolution rates for the samples were tested at 150° F. The mass of the samples were measured on specific days (shown in Table 2B) over the testing period. Resulting data is shown in Table 2B below and in FIG. 5.

TABLE 2B

| Sample | Elapsed Time (d) | Sample Mass (g) | Packaged Bag Mass (g) | Percent Change (%) | Packing Mass (g) |
|---|---|---|---|---|---|
| 2A | 0 | 3.02 | 3.26 | 0.00% | 0.24 |
| 2A | 7 | — | 2.95 | −10.26% | — |
| 2A | 14 | — | 2.93 | −10.93% | — |
| 2A | 21 | — | 2.91 | −11.59% | — |
| 2A | 28 | — | 2.88 | −12.58% | — |
| 2B | 0 | 3.01 | 3.34 | 0.00% | 0.33 |
| 2B | 7 | — | 0.35 | −99.34% | — |
| 2B | 14 | — | 0.34 | −99.67% | — |
| 2B | 21 | — | 0.34 | −99.67% | — |
| 2B | 28 | — | 0.36 | −99.00% | — |

As seen, Sample 2B shows a rate of mass change that is markedly greater than that of Sample 2A. This illustrates that the formulations of the present invention provide for an accelerated release polyphosphate glass for faster release of scale inhibiting chemicals.

The above illustrate various embodiments of the present invention for polyphosphate glass scale inhibitors having predetermined dissolution rates for slow and fast dissolutions.

While this invention may be embodied in many different forms, there are shown in the drawings and described in detail herein specific embodiments of the invention. The present disclosure is an exemplification of the background and principles of the invention and is not intended to limit the invention to the particular embodiments illustrated. All patents, patent applications, scientific papers, and any other referenced materials mentioned anywhere herein are incorporated by reference in their entirety for all purposes, including in providing materials, formulations, formulation methods and methods for making, performing and using as they relate to the methods and compositions of the present invention. Furthermore, the invention encompasses any possible combination of some or all of the various embodiments described herein and incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

References to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Various embodiments of the present invention have been described. Nevertheless, it will be understood that various modifications may be made without departing from the spirit and scope of the invention. Those skilled in the art may recognize other equivalents to the specific embodiment described herein which equivalents are intended to be encompassed by the claims attached hereto. For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A scale inhibitor composition for inhibiting scale in induced hydraulic fractures in hydraulic fracturing treatment of oil and/or gas wells comprising a polyphosphate glass component, the polyphosphate glass component comprising a reaction product of a mixture of components comprising from about 52 to about 75 wt. % of a phosphorus-containing compound, from about 6 to about 12 wt. % of a calcium-containing compound, from about 5 to about 10 wt. % of a magnesium-containing compound and from 1 to 20 wt. % of one or more controlled release additives comprising an aluminum-containing compound, a silicon-containing compound, or a zinc-containing compound, wherein:

the polyphosphate glass component being in the form of particles sized for insertion into fractures of hydraulically fractured wells and having a size of at least 100 mesh; and either;

the polyphosphate glass component comprises the aluminum-containing compound and dissolves at a rate of loss of less than 60% of the starting total mass over a 28 day period, when heated to 300° F. in deionized water at a concentration of 5 g polyphosphate glass per 300 mL deionized water; or the polyphosphate glass component comprises the silicon- or zinc-containing compound and dissolves at a rate of loss less than 20% of the starting total mass over a 1 day period and greater than 20% of the starting total mass over a 28 day period, when heated to 150° F. in deionized water at a concentration of 5 g polyphosphate glass per 300 mL deionized water.

2. The composition of claim 1, wherein the aluminum-containing compound comprises alumina, aluminum hydroxide, aluminium oxide hydroxide, a naturally occurring or synthetic alumina-containing mineral or polymorphs thereof, an aluminate salt or polymorphs thereof, an organic aluminum, or a combination thereof;

the silicon-containing compound comprises silica, a cyclic siloxane, a silicate salt, or a combination thereof; and the zinc-containing compound comprises a zinc oxide, a zinc salt, or a combination thereof.

3. The composition of claim 2, wherein the phosphorous-containing compound comprises phosphoric acid, polyphosphoric acid, a phosphate salt, a phosphate ester, or a phosphonate salt; the calcium-containing compound comprises calcium hydroxide, calcium oxide, calcium carbonate, or a combination thereof, and the magnesium-containing compound comprises magnesium hydroxide, magnesium oxide, magnesium carbonate, or a combination thereof; and the mixture further comprises a high-pH alkaline chemical comprising sodium carbonate, sodium hydroxide or a combination thereof.

4. The composition of claim 3, wherein the aluminum-containing compound comprises alumina or aluminum hydroxide.

5. The composition of claim 4, wherein the mixture comprises 2-10 wt % alumina or aluminum hydroxide.

6. The composition of claim 3, wherein the silicon-containing compound comprises silica.

7. The composition of claim 6, wherein the mixture comprises 2-10 wt % silica.

8. The composition of claim 1, wherein the mixture consists essentially of the calcium-containing compound, the magnesium-containing compound, the phosphorous-containing compound, a high-pH alkaline compound and the one or more controlled release additives, wherein the polyphosphate glass component is a slowed release polyphosphate glass and the one or more controlled release additives is alumina or aluminum hydroxide; or the polyphosphate glass component is an accelerated release polyphosphate glass and the one or more controlled release additives is silica.

9. The composition of claim 3, the polyphosphate glass component comprising a blend of a plurality of modified polyphosphate glasses, the plurality of modified polyphosphate glasses including at least one slowed release polyphosphate glass and at least one accelerated release polyphosphate glass, wherein the blend of a plurality of modified polyphosphate glasses exhibits a compound rate of dissolution.

10. The composition of claim 1, wherein the mixture further comprises 5 to 10 wt. % of a high-pH alkaline compound; and the controlled release additive compound comprises either:
   an aluminum-containing compound comprising aluminum hydroxide, alumina, aluminium oxide hydroxide, corundum, ruby, sapphire, bauxite, gibbsite, boehmite, diaspore, an aluminum halide, nitrate, phosphate or metaphosphate, a trialkylaluminum compound, or a combination thereof; or
   a silicon-containing compound comprising silica, a cyclic siloxane, an orthosilicate salt, a metasilicate salt, or a combination thereof; or
   a zinc-containing compound comprising a zinc oxide, a zinc salt, zinc carbonate, and combinations thereof.

11. The composition of claim 1, wherein the polyphosphate glass component comprises the aluminum-containing compound and dissolves at the rate of loss of less than 60% of the starting total mass over the 28 day period, when heated to 300° F. in deionized water at the concentration of 5 g polyphosphate glass per 300 mL deionized water.

12. The composition of claim 1, wherein the polyphosphate glass component comprises the silicon- or zinc-containing compound and dissolves at the rate of loss less than 20% of the starting total mass over the 1 day period and greater than 20% of the starting total mass over the 28 day period, when heated to 150° F. in deionized water at the concentration of 5 g polyphosphate glass per 300 mL deionized water.

13. A method of preparing the polyphosphate glass component of claim 1, the method comprising:
   mixing the phosphorous-containing compound, a high-pH alkaline compound, the calcium-containing compound, the magnesium-containing compound, and the one or more controlled release additives to form the mixture which undergoes a first reaction;
   heating the mixture to a temperature of at least 1100° C. to form a glassy melt, the heated mixture undergoing a second reaction; and
   cooling the glassy melt to form the polyphosphate glass component, wherein the polyphosphate glass component is a slow release polyphosphate glass if the one or more controlled release additives comprises the aluminum-containing compound, and the polyphosphate glass component is an accelerated release polyphosphate glass if the one or more controlled release additives comprises the silicon-containing compound or the zinc-containing compound.

14. The method of claim 13, further comprising grinding the polyphosphate glass component into particles sized for insertion into fractures of hydraulically fractured wells and having a size of at least 100 mesh.

15. The method of claim 13, the polyphosphate glass component comprising a blend of a plurality of modified polyphosphate glasses, the plurality of modified polyphosphate glasses including at least one slowed release polyphosphate glass and at least one accelerated release polyphosphate glass, and wherein the method further comprises blending at least one slowed release polyphosphate glass with at least one accelerated release polyphosphate glass to form the plurality of modified polyphosphate glasses, wherein the plurality of modified polyphosphate glasses exhibits a compound rate of dissolution.

16. A method of inhibiting scale formation in a subterranean formation, the method comprising mixing the composition of claim 1 with one or more proppants to form a mixture and injecting the mixture under pressure into hydraulically generated fractures of a wellbore.

17. A method of inhibiting scale formation in an industrial water system, the method comprising:
   adding the scale inhibitor composition of claim 1 to an aqueous fluid within the system to inhibit scale formation on a surface of the system which is in contact with the fluid.

18. The method of claim 17, wherein the surface is within a heat exchanger, a cooling tower, a pipeline, a water softener, a waste water treatment system, a paper mill, a mining system, a geothermal system, a fluid cooling system, a water treatment system, a water purification system, a wastewater treatment system, a reverse osmosis membrane, an ultrafiltration system, a water storage system, or an ion exchanger.

19. A method of inhibiting scale formation in a subterranean formation, the method comprising mixing the composition of claim 10 with one or more proppants to form a mixture and injecting the mixture under pressure into hydraulically generated fractures of a wellbore.

20. A method of inhibiting scale formation in an industrial water system, the method comprising:
   adding the scale inhibitor composition of claim 10 to an aqueous fluid within the system to inhibit scale formation on a surface of the system which is in contact with the fluid.

* * * * *